J. MONTGOMERY.

Screw-Propellers.

No. 5,364.

Reissued April 22, 1873.

WITNESSES:

Jas. L. Ewin

Walter Allen

INVENTOR:

James Montgomery,

By Knight Bros. Attorneys.

UNITED STATES PATENT OFFICE.

JAMES MONTGOMERY, OF SING SING, NEW YORK.

IMPROVEMENT IN SCREW-PROPELLERS.

Specification forming part of Letters Patent No. 23,598, dated April 12, 1859; extended seven years; reissue No. 5,364, dated April 22, 1873; application filed March 28, 1873.

*To all whom it may concern:*

Be it known that I, JAMES MONTGOMERY, of Sing Sing, in the county of Westchester and State of New York, formerly of Baltimore, Maryland, have invented certain Improvements in Screw-Propellers, of which the following is a specification:

*Nature and Objects of the Invention.*

This invention relates to screw-propellers in which the blades are encircled by a cylinder or band to afford mutual support to the blades at the periphery, resist the tangential movement of the water, and prevent the fouling of the screw with cables, floating bodies, or other matter. My improvements consist, first, in securing the surrounding cylinder by the aid of solid tenons projecting from the peripheries of the blades into mortises in the cylinder; second, in constructing the hub of the screw of segments, each formed in one piece with one of the blades, the said hub-segments affording ready means of securing the screw to the shaft by the aid of hub-bands and other appliances. The divided structure of the hub also facilitates the putting together of the screw within an encircling band or cylinder secured upon projecting tenons, as aforesaid.

*General Description.*

Figure 1:
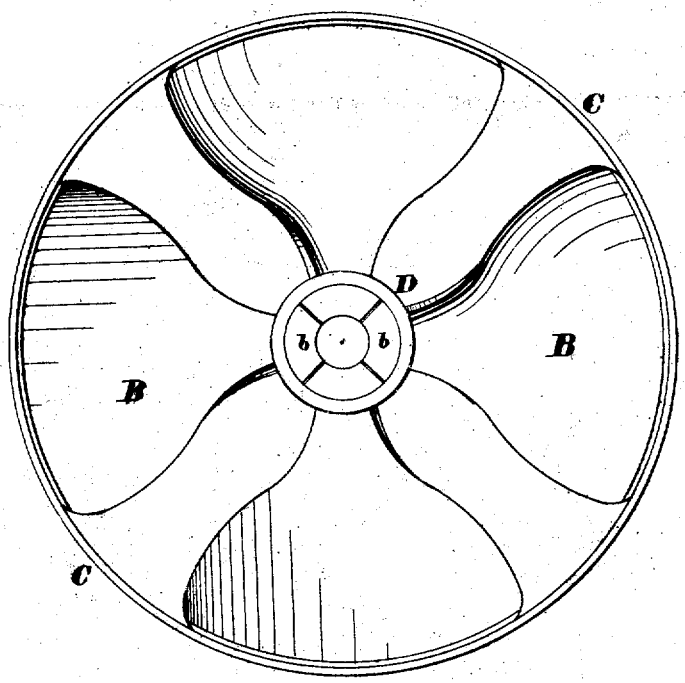
Figure 2:
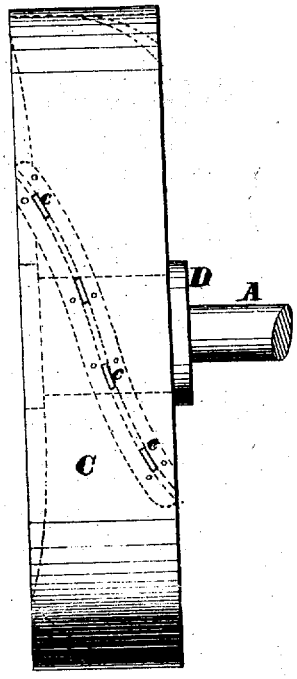
Figure 3:
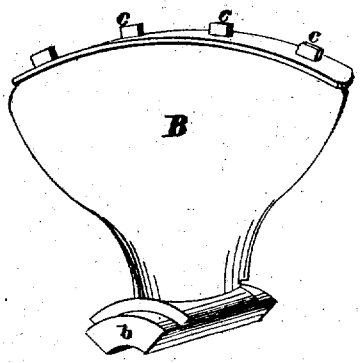

In the accompanying drawing, Figure 1 is an end view of a screw-propeller illustrating my invention. Fig. 2 is a side elevation thereof. Fig. 3 is a perspective view of one blade and hub segment detached from the shaft and from the surrounding cylinder.

A represents the shaft of the propeller. B B are helical blades cast or forged separately, and each formed in one piece with a segmental flange, *b*, which flanges are made to clasp the shaft, and are there firmly secured by bands D, so as to form, collectively, the hub of the screw. The bands D D are, by preference, shrunk on the hub *b b*, or they may be formed with taper screw-threads adapted to fit corresponding screw-threads chased upon the hub. C is a cylindrical casing surrounding the screw, secured by means of solid tenons *c c* projecting from the peripheries of the blades through mortises in the cylinder. It may also be riveted, as shown. This cylindrical casing affords mutual support to the ends of the blades and binds the whole structure firmly together in a similar manner to the tire of a carriage-wheel, so that a strain or shock imparted to any one of the blades is equally sustained by all. The more rapid the motion of the vessel the coarser should be the pitch of the screw by which it is propelled. The obliquity of the blades will therefore be adapted to accord with the model of the boat or vessel for which the screw is intended. The connection between the ends of the blades and the cylindrical casing is required to withstand a strain for which rivets alone would be entirely insufficient. The tenons *c* are therefore formed in one piece with the blade, and, by engaging in corresponding mortises in the casing, prevent such play or motion between the two as would sever and destroy the rivets. When the blades are constructed of wrought-iron the ends of the tenons will be upset or clinched on the outside of the casing, but with cast blades the tenons will be made in dovetail form and secured in the casing by calking or wedging from the outside.

A screw-propeller surrounded by a cylindrical band is prevented from fouling with tow-lines, drift-wood, water-grasses, and other matters. It is also less liable to injure canal-banks, and the mutual support afforded by all the blades permits them to be made extremely light, so that the propeller meets with less resistance in cleaving the water, and is a less ponderous burden to the stern of the vessel. The casing is also very valuable in arresting or resisting the tangential motion of the water, which involves serious loss of power, and, in the case of canal navigation, is highly injurious to the banks.

I am aware that it has heretofore been proposed to apply surrounding bands or cylinders to screw-propellers in various ways, but I have, as before stated, devised a novel, practical, and efficient mode of securing and uniting such surrounding cylinders to the blades, and also an effective practical mode of fabricating and putting together an incased screw and securing it to its shaft.

*Claims.*

The following is claimed as new:

1. A screw-propeller composed of a plurality of blades surrounded by a cylinder or casing, secured by means of solid tenons projecting from the peripheries of the blades into mortises in the casing, substantially as described.

2. The propeller-blades B, each formed in one piece with a segment, *b*, of the hub, in combination with a surrounding cylinder, C, substantially as set forth.

JAMES MONTGOMERY.

Witnesses:
WM. F. MCNAMARA,
WM. J. TURNER.